(12) United States Patent
Xue et al.

(10) Patent No.: US 8,294,706 B2
(45) Date of Patent: Oct. 23, 2012

(54) VOLUME RENDERING USING N-PASS SAMPLING

(75) Inventors: Daqing Xue, Plainsboro, NJ (US); Lining Yang, East Windsor, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1252 days.

(21) Appl. No.: 11/758,267

(22) Filed: Jun. 5, 2007

(65) Prior Publication Data

US 2008/0031402 A1 Feb. 7, 2008

Related U.S. Application Data

(60) Provisional application No. 60/835,362, filed on Aug. 3, 2006.

(51) Int. Cl.
*G06T 15/00* (2006.01)
*G06T 15/50* (2006.01)
*G06T 15/60* (2006.01)
(52) U.S. Cl. ........................ 345/419; 345/426
(58) Field of Classification Search .................. 345/419, 345/426
See application file for complete search history.

(56) References Cited

U.S. PATENT DOCUMENTS

2003/0169305 A1* 9/2003 Hodges .......................... 345/850

OTHER PUBLICATIONS

Mitchell, D. P. Generating Antialiased Images at Low Sampling Densities. Computer Graphics, vol. 21(4), (Jul. 1987), pp. 65-72.*
Frisken, S. F., Perry, R. N., Rockwood, A. P., and Jones, T. R. 2000. Adaptively sampled distance fields: a general representation of shape for computer graphics. In Proceedings of the 27th Annual Conference on Computer Graphics and interactive Techniques International Conference on Computer Graphics and Interactive Techniques. ACM Press/Addison-We.*
Genetti, J., and Gordon, D. Dec. 31, 1993. Ray tracing with adaptive supersampling in object space. In Proceedings of Graphics Interface '93, Canadian Information Processing Society, Toronto, Ontario, 70-77.*
John Canny, "A Computational Approach to Edge Detection", IEEE Transactions on Pattern Analysis and Machine Intelligence, vol. 8, No. 6, Nov. 1986, 20 pages.
Marc Levoy, "Display of Surfaces from Volume Data", IEEE Computer Graphics and Applications, 8(5):29-37, 1988, 9 pages.
March Levoy, "Volume Rendering by Adaptive Refinement", The Visual Computer: International Journal of Computer Graphics, 6(1):2-7, 1990, 6 pages.

* cited by examiner

*Primary Examiner* — Aaron M Richer
*Assistant Examiner* — Robert Craddock
(74) *Attorney, Agent, or Firm* — Peter Kendall

(57) ABSTRACT

A system and methods for volume rendering using n-pass sampling are disclosed. A plurality of first rays in a first density is sampled through a volume. Each of the first rays is in a separate section. A value of at least one first ray is compared to a first threshold. A plurality of second rays in a second density is sampled based on the comparison of the at least one first ray. The second rays are in a first section of the separate sections. The first section being for the at least one first ray. A value of at least one second ray is compared to a second threshold. A plurality of third rays is sampled in a second section spatially different than the first section based on the comparison of the at least one second ray. An image rendered from the sampling of at least the first rays is displayed.

13 Claims, 3 Drawing Sheets

US 8,294,706 B2

VOLUME RENDERING USING N-PASS SAMPLING

CLAIM OF PRIORITY

This application claims the benefit of the U.S. provisional application 60/835,362 filed on Aug. 3, 2006, which is hereby incorporated by reference.

FIELD OF THE INVENTION

The present invention relates to medical imaging. In particular, high quality volume rendering using n-pass sampling is provided.

BACKGROUND

Medical professionals utilize a variety of imaging techniques to generate images of internal features of humans, animals, and other objects. For example, three dimensional ("3D") images generated via volume rendering are useful for understanding spatial dimensions of internal features. Volume rendering may involve ray-casting in which virtual rays are cast through a volume data set, and points along the rays are sampled for image generation purposes. Ray-casting is one of the most popular rendering techniques used to generate the highest quality images. However, as volume data sets increase in size, the number of sampling rays or amount of interpolation also increase. Consequently, processing of the information degrades due to intensive computation and memory access. The degradation is even more problematic during interactive modes where the displayed image is being rotated or shifted by a medical professional for viewing.

To increase rendering speed, especially during interactive mode, a smaller image (lower resolution) is rendered and then is scaled in a two-dimensional ("2D") plane to the appropriate resolution. However, reducing the image resolution in each dimension may result in poor image quality.

Image-space adaptive sampling is another approach to increase rendering speed. In this method, image space is divided into sub-regions (tiles). A number of low density sampling rays are cast through a volume data set, one for each region. An algorithm determines whether to cast more rays or perform 2D interpolation for a given region. For each region, the determination is based on whether an object is indicated along the cast ray for the region. However, fine features, such as vessels and bronchioles, may be missed, which tends to blur the image.

BRIEF SUMMARY

By way of introduction, the preferred embodiments described below include an imaging system with a processor for volume rendering and methods of volume rendering using n-pass sampling. A plurality of rays in a lower density are sampled through a volume, and more rays in another density are sampled based on an indication of an object. The regions for higher density sampling are selected based on subsequently acquired or multiple samples. More information beyond the local sample of the sampling rays in a first pass is used to determine regions for higher density sampling.

According to a first aspect, a method of volume rendering is provided. A plurality of first rays in a first density is sampled through a volume. Each of the first rays is in a separate section. A value of at least one first ray is compared to a first threshold. A plurality of second rays in a second density is sampled based on the comparison of the at least one first ray. The second rays are in a first section of the separate sections. The first section being for the at least one first ray. A value of at least one second ray is compared to a second threshold. A plurality of third rays is sampled in a second section spatially different than the first section based on the comparison of the at least one second ray. An image rendered from the sampling of at least the first rays is displayed.

According to a second aspect, a computer-readable medium has stored therein instructions executable by a processor. The instructions include sampling a plurality of first rays in a first density through a volume. Each of the first rays is in a separate section. If a sampling value difference between at least two first rays is above a first threshold, a plurality of second rays in a second density is sampled. The second rays are in a first section of the separate sections. The first section being for one of the at least two first rays. If a sampling value difference between a first one of the second rays and another ray is above a second threshold, a plurality of third rays is sampled in a second section spatially different than the first section.

According to a third aspect, a volume rendering system for increasing resolution of an object and increasing rendering speed by rendering with a lesser density for non-object regions is provided. The system includes a memory operable to store volume data. A processor is in communication with the memory and operable to sample the volume data along a plurality of first rays in first sections, respectively. The processor is operable to sample, with a plurality of second rays having a higher spatial density than the first rays, the data in each first section having a first sample value of the respective first ray higher than a second sample value of another first ray, the difference between the first and second sample values above a first threshold. The processor is operable to compare a second sample value of at least one second ray with a third sample value of a first or second ray. The processor is operable to sample, with a plurality of third rays at different locations than the first and second rays, if the comparing to the second sample value indicates a value difference above a second threshold. A display is in communication with the processor and operable to display an image as a function of the first, second, and third rays.

Embodiments of the present invention are defined by the following claims, and nothing in this section should be taken as a limitation on those claims. Further aspects and advantages of the invention are discussed below in conjunction with the exemplary embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF EXEMPLARY EMBODIMENTS

An n-pass adaptive sampling technique is used to improve image quality for volume visualization, especially for interactive mode. The technique involves sampling more rays to capture fine features of images while eliminating unnecessary rays as much as possible. Coarse features are captured in a first pass, and more sampling rays are adaptively added in image areas, such as border or edge regions, in subsequent passes. Neighboring as well as local information is utilized to achieve better rendering quality.

Figure 1:
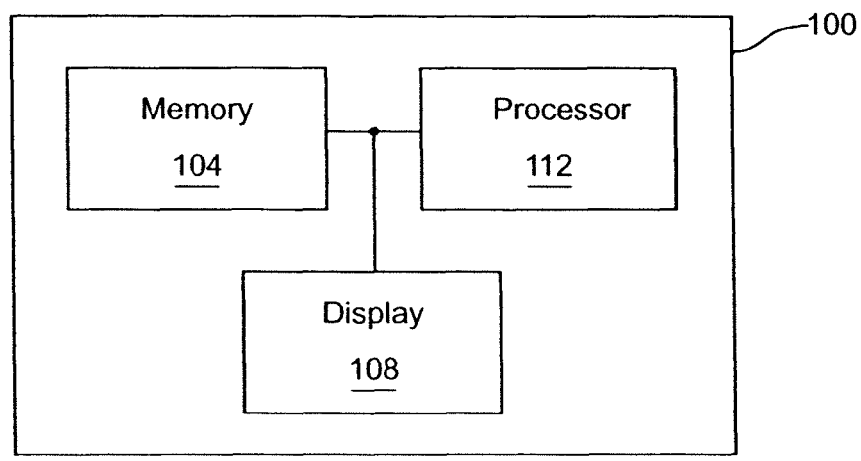
FIG. 1 is a diagram of one embodiment of an imaging system for volume rendering using n-pass sampling.

FIG. 1 shows one embodiment of an imaging system 100 for volume rendering using n-pass sampling. The imaging system 100 is a computed tomography ("CT") scanner, a magnetic resonance imaging ("MRI") system, an ultrasound system, a positron emission tomography ("PET") scanner, or any known or future medical or non-medical imaging system. In other embodiments, the imaging system 100 is a computer, a workstation, server, and/or an image database system.

The imaging system 100 includes, but is not limited to, a memory 104, a display 108, and a processor 112. Additional, different, or fewer components may be provided. For example, shift registers, buffers, rendering pipelines, graphic acceleration components, bus logic, gradient estimation stages, and any other software and/or hardware components for volume rendering may be included in the imaging system 100.

The memory 104 is a "computer-readable medium," "machine-readable medium," "propagated-signal" medium, and/or "signal-bearing medium" and may comprise any device that contains, stores, communicates, propagates, or transports software or data, such as a volume data set, for use by or in connection with a processor or an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium also includes a tangible medium upon which software is printed, as the software may be electronically stored as an image or in another format (e.g., through an optical scan), then compiled, and/or interpreted or otherwise processed.

The display 108 is any mechanical and/or electronic display positioned for accessible viewing by a doctor or medical professional. For example, the display 108 is a liquid crystal display ("LCD") or cathode ray tube ("CRT") monitor. The display 108 is operable to show 2D, 3D, and/or four dimensional ("4D") images (i.e., the fourth dimension is time, and, therefore, 4D images are a sequence of images that show an object over a time period).

The processor 112 is in communication with the memory 104 and the display 108. The processor 112 is a digital signal processor, graphics processing unit, main processor, microprocessor, field programmable gate array, analog circuit, digital circuit, or combinations thereof. The processor 112 is a single device or a plurality of processors. For example, the processor 112 is one central processing unit ("CPU") operable to enable or conduct the n-pass sampling techniques, as described in more detail below. Alternatively, the processor 112 is a plurality of CPUs in which each CPU is responsible for sampling and/or processing a portion of the data acquired by the imaging system 100.

Figure 2:
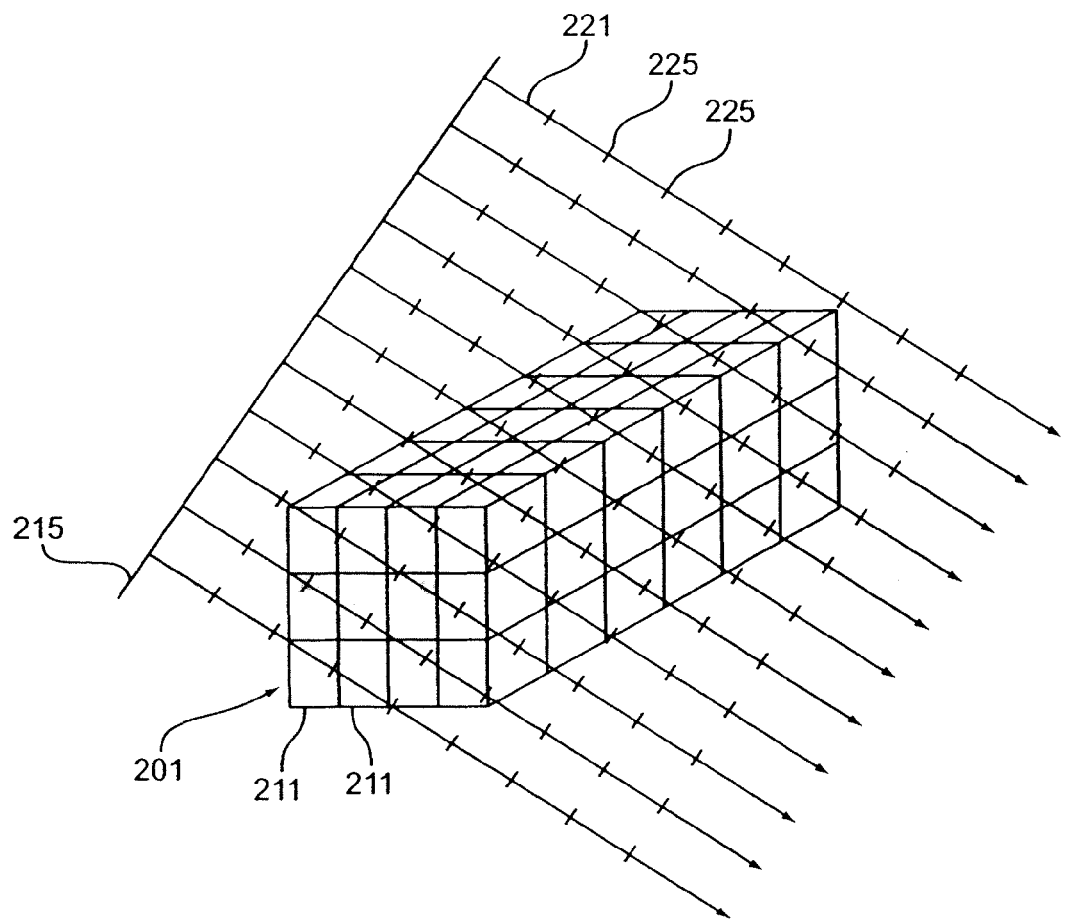
FIG. 2 is a perspective view of an example of sampling data of a volume data set.

Referring to FIG. 2, a volume data set 201 is acquired by the imaging system 100 and stored in the memory 104. The volume data set 201 includes a plurality of voxels 211. For example, the volume data set 201 is a 512×512×4096 voxel set. Each of the vertices shown in FIG. 2 represents a corner of one of the voxels 211. Alternatively, each vertex represents one voxel 211 or a center of the voxel 211. The voxels 211 correspond to three perpendicular axes, and the voxels 211 are equally spaced in each dimension. Alternatively, the voxels 211 may have different spacing in each of the dimensions exhibiting anisotropic qualities. Also, any one of the three dimensions may be oblique to another one of the three dimensions exhibiting a shearing quality. In addition, any graphics transformations may be utilized to adjust the volume data set 201. For example, physical, world, object, permuted, and sample coordinates may be used in representing the volume data set 201.

The processor 112 is operable to enable or sample rays 221 extending from an image plane 215. The rays 221 shown are parallel, but may diverge from a location on or spaced from the image plane 215. The image plane 215 is shown as a line such that the plane extends at a right angle to the figure. The rays 221 pass through the volume data set 201, and the volume data set 201 is sampled at sample points 225. Masking may be used to limit sampling or sample points 225 to within a boundary, such as the edges of the volume data set 201. Any number of the rays 221 and the sample points 225, at various depths, may be used.

FIG. 3 is an image plane view of an example of n-pass sampling. FIG. 3 includes sub-FIGS. 3a, 3b, 3c, and 3d for illustrative purposes. For example, FIG. 3a shows an object 304 viewed from an image plane, such as the image plane 215. The rays are orthogonal to the figure. The object 304 is an internal feature represented by data within a volume data set, such as the volume data set 201. A grid 300, positioned in the image plane, covers all or a portion of the object 304. The grid 300 may encompass all or a portion of the volume data set. Each grid point on the grid 300 represents a pixel in the image plane. A value for each grid point is determined for generating an image in the image plane.

In a first pass, a plurality of rays 308 in a first density are sampled through the volume data set, and each of the rays 308 are in a separate section of the grid 300. For example, the grid 300 is divided into major sections and a certain number of the rays 308 are sampled in the major sections. The major sections may be 8×8, 16×16, or any other section size. Alternatively, the major sections are divided into varying dimensional sections including triangular, rectangular, or any other geometrical shapes at constant and/or varying spacing. Any number of the rays 308 may be sampled at any density. For example, the grid 300 is divided into equal 8×8 sections. In each section, five rays 308 are sampled. Four of the rays 308 are sampled at the corners of the 8×8 sections, and one ray 308 is sampled at the center of each 8×8 section. Some of the rays 308 are shared by multiple major sections.

For sampling, a ray value is determined from the voxels intersected by or along the ray. Interpolation from difference voxels may be used. The data along the ray at different depths is used to determine the ray value. The value is a maximum sample point value, a minimum sample point value, integrated sample point value, an average, a blend, or any other value associated with the sample points of a sampling ray.

Figure 3A:
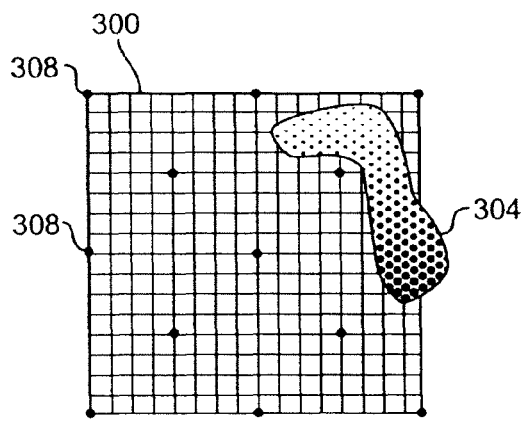
FIG. 3 illustrates image plane views in one example of n-pass sampling.

As shown in FIG. 3a, one of the rays 308 indicates the existence of the object 304. The object can be indicated by comparing a value associated with one of the rays 308 with another one of the rays 308 or a threshold.

The value of the corner rays 308 are compared to the value of the center ray 308 for each of the major sections of the grid 300. Alternatively, any one ray 308 from one section is compared with any other ray 308 of another section. The comparison includes determining a difference in the values and determining if the difference is above a predetermined threshold. Alternatively, the comparison may include any mathematical calculation such as summation, multiplication, division, and/or any other numerical function to manipulate or transform a value or a plurality of values for comparing to the predetermined threshold. Or, the comparison includes comparing a value of one ray with a threshold.

If the difference in the values between at least two of the rays 308 is above the predetermined threshold, a plurality of rays in a second density are sampled. The second density is higher than the first density. For example, referring to FIG. 3b, because the value difference between the ray 308 that indicated the object 304 and another ray 308, such as the center ray 308 for the respective major section, is above the predetermined threshold, rays 310 are sampled in first sections 314 that include the rays 308, which indicated the object 304. Alternatively, more rays may be sampled in any of the passes based on the indication of the object 304 rather than the difference value.

Because the sampling of more rays is based on the predetermined threshold, additional rays are not sampled when the value difference is determined to be below the predetermined threshold between two rays 308 that both have high sample values (i.e., both rays indicate the object 304). However, interpolation of values may be used in such grid regions. Also, back propagation may be used. For example, once the rays 310 are sampled in one first section 314, previous neighboring sections that included rays 308 with high values may be further sampled.

Figure 3B:
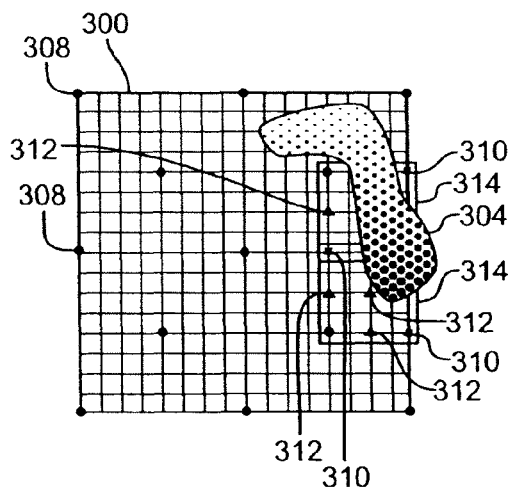

The first sections 314 are localized subsections of the respective major sections. The first sections 314 can be any size, such as a 4×4, 2×2, or 1×1 section size. FIG. 3b shows the first sections 314 as 4×4 sections, and the rays 310 are used to complete a 4×4 grid section within the major section adjacent to or around the rays 308, which indicated the object 304. For example, one of the rays 308 that indicated the object is a corner ray of one of the first sections 314 or is any other ray, such as a center ray, within one of the first sections 314. The first sections 314 are located in regions of the grid 300 that include the rays 308, which indicated the object 304, for sampling more rays in that localized region. Alternatively, interpolation may be utilized instead of casting more rays, or a combination of additional rays and interpolation may be used.

Values of the rays 310 are compared to the values of the rays 308 and/or other rays 310. The comparison is similar to the comparison described above. For example, a value of one of the rays 310 is compared to one of the center rays or corner rays 308 of the respective major section. Alternatively, the value of rays 310 are compared with each other instead of the rays 308. The comparison includes determining a difference in the values and determining if the difference is above a predetermined threshold. The predetermined threshold may be the same or different than the predetermined threshold for the original comparison of the rays 308.

If the rays 310 do not indicate the object 304, rays 312 in a higher density are sampled. For example, referring to FIG. 3b, because none of the rays 310 indicate the object 304, the rays 312 are sampled in subsections within the localized first sections 314 to obtain more data. The first subsections represent 2×2 grid sections within the respective first sections 314. However, the first subsections can have any dimensions within the first sections 314. The rays 310 and 312 are sampled at grid points that are not associated with previous sampling rays. Alternatively, a re-sampling may occur. For example, the rays 310 and 312 are sampled at grid points that already are associated with previous sampling rays.

If the rays 310 do indicate the object 304, further sampling in the first sections 314 is discontinued. Alternatively, if the rays 310 do indicate the object 304, sampling in a higher density occurs to obtain more data. Any comparison or indication technique described above can be used to further sample rays in higher and higher densities within the localized region to acquire more data for imaging.

Also, rays in higher densities can be sampled at the outset when the difference in the values of the at least two of the rays 308 is above the predetermined threshold. For example, the rays 312 are sampled in localized 2×2 or 1×1 sections when the value difference is above the predetermined threshold without using the rays 310. Alternatively, interpolation may be utilized instead of casting more rays, or a combination of additional rays and interpolation may be used.

Figure 3C:
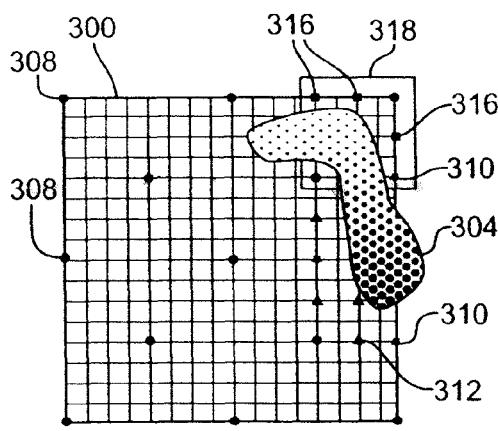
Figure 3D:
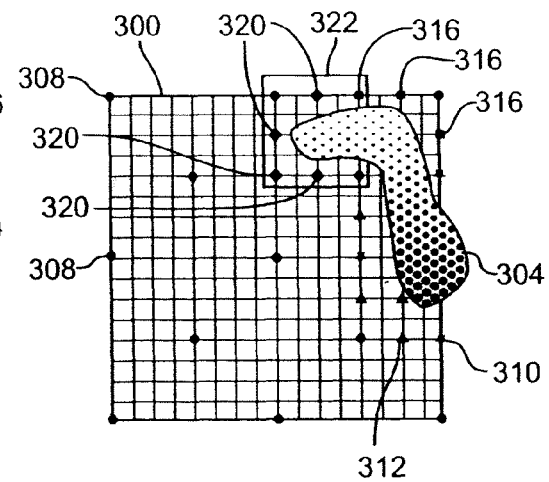

Therefore, a portion of the object 304 is further sampled in a local region that includes one of the rays 308 that indicated the object 304. FIGS. 3c and 3d illustrate subsequent passes that capture the remaining portions of the object 304.

In a second pass, referring to FIG. 3c, the value of the rays 310 or 312 are compared with the value of the rays 308 in a second section 318 separate from the localized first sections 314 or first subsections. For example, the second section 318 is a neighboring section of one of the first sections 314. The second section 318 shares at least one of the rays 308, 310, or 312 of at least one of the first sections 314. For example, a corner ray or ray on the perimeter of one of the first sections 314 is a corner ray or ray on the perimeter of the second section 318. There may be a plurality of second sections 318 neighboring the first sections 314 so that the first sections 314 are completely surrounded by the second sections 318. The second section 318 can be any geometrical shape with any dimensions. For example, the second section 318 is a 4×4 section. All or some of the second section 318 is scanned, and the values of the rays 310 or 312 within the second section 318 are compared with each other or compared with the values of the rays 308 within the second section 318. Alternatively, the value of the rays 310 and 312 within the second section 318 can be compared with any other ray value in the grid 300.

The comparison is similar to the comparison described above. For example, a value of all of the rays 310 or 312 within the second section 318 are compared to at least one of the center rays or corner rays 308 of the respective major section to determine if the rays 310 or 312 indicate the object 304. Alternatively, the value of rays 310 or 312 may be compared with each other instead of the rays 308. The comparison includes determining a difference in the values and determining if the difference is above a predetermined threshold. The predetermined threshold may be the same or different than the predetermined threshold for comparisons in the first pass. For example, the predetermined threshold in the second pass is lower than the predetermined threshold in the first pass to capture finer detail.

If the difference in values between one of the rays 310 or 312 in the second section 318 and another ray, such as one of the rays 308, is above the predetermined threshold, a plurality of rays 316 are sampled in the second section 318. The rays 310 or 312 that indicated the object are corner rays or rays on the perimeter of the second section 318. The rays 316 are sampled at densities higher than the rays 308. For example the rays 316 are sampled in a 4×4, 2×2, or 1×1 section. The rays 316 are sampled at grid points that are not associated with previous sampling rays. Alternatively, a re-sampling may occur. For example, the rays 316 are sampled at grid points that already are associated with previous sampling rays.

Alternatively, interpolation may be utilized instead of casting more rays, or a combination of additional rays and interpolation may be used.

Because the sampling of more rays is based on the predetermined threshold, additional rays are not sampled when the value difference is determined to be below the predetermined threshold between one of the rays 310 or 312 and the other ray that both have high sample values (i.e., both rays indicate the object 304). However, interpolation of values may be used in such grid regions. Also, back propagation may be used. For example, once the rays 316 are sampled in one second section 318, previous neighboring sections that included the rays 310 or 312 and the other ray with high values may be further sampled.

In a third pass, referring to FIG. 3d, the value of the rays 316 are compared with the value of the rays 308, 310, and/or 312 in a third section 322 separate from the first sections 314, the first subsections, and the second sections 318. For example, the third section 322 is a neighboring section of the second section 318. The third section 322 shares at least one of the rays 308, 310, 312, or 316 of the second section 318. For example, a corner ray or ray on the perimeter of the second section 318 is a corner ray or ray on the perimeter of the third section 322. There may be a plurality of third sections 322 neighboring the second section 318 so that the second sections 318 is surrounded by the third sections 322 in locations where previous sections were not analyzed. There may be a plurality of third sections 322 neighboring the second section 318. The third section 322 can be any geometrical shape with any dimensions. For example, the third section 322 is a 4×4 section. The values of the rays 316 within the third section 322 are compared with each other or compared with the rays 308, 310 and/or 312 within the third section 322. Alternatively, the value of the rays 316 within the third section 322 can be compared with any other ray value in the grid 300.

The comparison is similar to the comparison described above. For example, a value of one of the rays 316 is compared to one of the center rays or corner rays 308 or the rays 310 or 312 of the respective major section. Alternatively, the value of rays 316 are compared with each other instead of the rays 308, 310, or 312. The comparison includes determining a difference in the values and determining if the difference is above a predetermined threshold. The predetermined threshold may be the same or different than the predetermined threshold for comparisons in the first pass or second pass. For example, the predetermined threshold in the third pass is the same as in the second pass and is lower than the predetermined threshold in the first pass to capture finer detail. If the difference is above the predetermined threshold, then an object is indicated at a grid point associated with the ray 316 having the higher value.

If the difference in values between one of the rays 316 in the third section 322 and another ray, such as one of the rays 308, 310, or 312, is above the predetermined threshold, a plurality of rays 320 are sampled in the third section 322. The rays 316 that indicated the object are corner rays or rays on the perimeter of the third section 322. The rays 320 are sampled at densities higher than the rays 308. For example the rays 320 are sampled in a 4×4, 2×2, or 1×1 section. The rays 320 are sampled at grid points that are not associated with previous sampling rays. Alternatively, a re-sampling may occur. For example, the rays 320 are sampled at grid points that already are associated with previous sampling rays. Alternatively, interpolation may be utilized instead of casting more rays, or a combination of additional rays and interpolation may be used.

Because the sampling of more rays is based on the predetermined threshold, additional rays are not sampled when the value difference is determined to be below the predetermined threshold between one of the rays 316 and the other ray that both have high sample values (i.e., both rays indicate the object 304). However, interpolation of values may be used in such grid regions. Also, back propagation may be used. For example, once the rays 320 are sampled in one third section 322, previous neighboring sections that included the rays 316 and the other ray with high values may be further sampled.

The comparison of further separate or neighboring sections continues for n-passes. For example, the generation of neighboring sections and sampling within new neighboring sections, as discussed above, continues until there is no more further indication of the object 304. Alternatively, further sampling is discontinued after a predetermined number of passes has been completed.

After or during sampling, image values are associated with each of the grid points of the grid 300, and an image is generated based on the image values in the image plane, such as the image plane 215. This n-pass sampling technique is used during a definitive (final) mode or an interactive mode. For example, the sampling of all or some of the rays for all or some of the passes occurs during an interactive mode in which user input received indicates a change in the viewing direction relative to the volume. As a result, a good image quality is maintained while reducing the amount of unnecessary sampling rays. Grid points for sections not associated with difference values above a predetermined threshold are sampled with a lower density. Grid points for sections associated with difference values above a predetermined threshold are sampled with a higher density. By checking adjacent sections, the full extent and fine features of the object may be determined.

Any volume rendering algorithm or mode may be used for n-pass sampling. For example, n-pass sampling may be applied to maximal intensity projection ("MaxIP"), direct volume rendering ("DVR"), shaded surface display ("SSD"), multi-planar reformatted ("MPR"), or minimum intensity projection ("MinIP") techniques.

Figure 4:
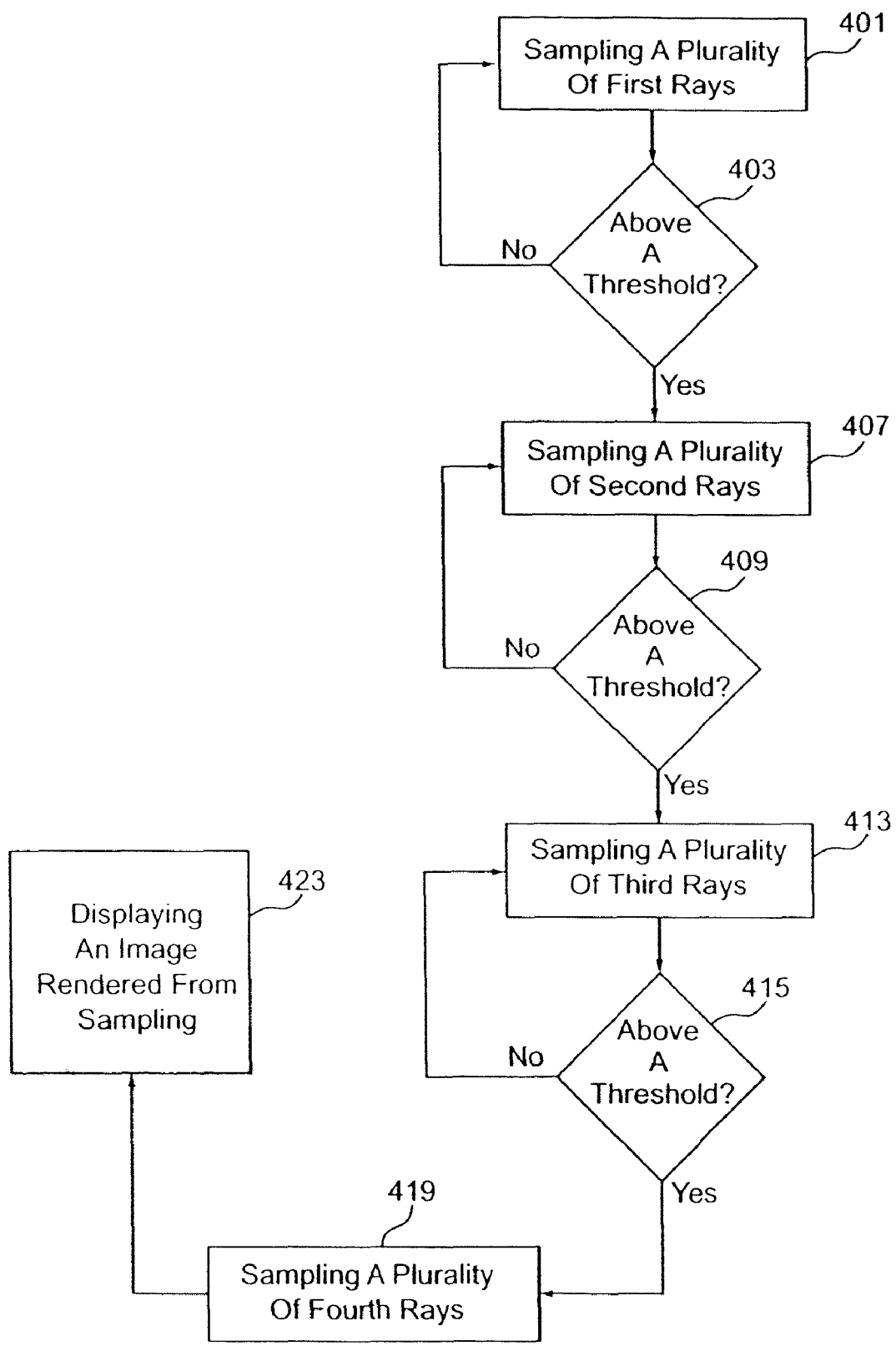
FIG. 4 is a flowchart of one embodiment of a method of volume rendering using n-pass sampling.

FIG. 4 is a flowchart of one embodiment of a method of volume rendering using n-pass sampling, as described above. In act 401, a plurality of first rays in a first spatial density are sampled through a volume, such as the volume data set 201. Each of the first rays are in a separate section, such as the rays 308 in the major sections of the grid 300.

In act 403, a value of at least one first ray is compared to a first threshold. For example, a sampling value difference between at least two first rays is determined to be above or below the first threshold. The value difference is based on a comparison of a sample value of one of the first rays with a sample value of another one of the first rays, such as the comparison of the rays 308, as described above. Alternatively, as mentioned above, any other mathematical calculation, transformation, or comparison other than a difference calculation may be used when comparing values to a predetermined threshold.

In act 407, if the sampling value difference between the at least two first rays is above the first threshold, a plurality of second rays, such as the rays 310 or 312, in a second spatial density are sampled. For example, the second spatial density is higher than the first spatial density. The second rays are in first sections, such as sections 314, within the respective major section of the grid. The first sections includes at least one of the first rays associated with the value difference above the first threshold. Therefore, the second rays attempt to retrieve more data in a localized region of the object indicated by the first ray. Alternatively, interpolation may be utilized instead of casting more rays, or a combination of additional rays and interpolation may be used.

In act 409, a value of at least one second ray is compared to a second threshold. For example, sampling value differences are determined to be above or below the second threshold. These value differences are based on a comparison of a sample value of one of the second rays with a sample value of another one of the second rays or a first ray, such as the comparison of the rays 310 or 312 with at least one of the center rays or corner rays 308 of the respective major section. If the value difference is below the second threshold, further sampling is discontinued in that section. Alternatively, if there is no indication of the object, more second rays in a higher spatial density are sampled. Also, if there is indication of the object, further sampling in a higher spatial density may occur.

In act 413, if a sampling value difference between a first one of the second rays and another ray is above the second threshold, a plurality of third rays, such as the rays 316, are sampled in a second section, such as the section 318, spatially different than the first section. For example, the second section is a neighboring section of one of the first sections, and the second section includes the first one of the second rays associated with the value difference above the second threshold. Alternatively, interpolation may be utilized instead of casting more rays, or a combination of additional rays and interpolation may be used.

In act 415, a value of at least one third ray is compared to a third threshold. For example, sampling value differences are determined to be above or below the third threshold. These value differences are based on a comparison of a sample value of one of the third rays with a sample value of another one of the third, second, or first rays, such as the comparison of the rays 316 with the rays 308, 310, and/or 312. If the value difference is below the third threshold, further sampling is discontinued in that section. Alternatively, if there is no indication of the object, more third rays in a higher spatial density are sampled. Also, if there is indication of the object, further sampling in a higher spatial density may occur.

In act 419, if a sampling value difference between a first one of the third rays and another ray is above the third threshold, a plurality of fourth rays, such as the rays 320, are sampled in a third section, such as the section 322, spatially different than the second or first section. For example, the third section is a neighboring section of one of the second sections, and the third section includes the first one of the third rays associated with the value difference above the third threshold. The first one of the third rays is a corner ray or a ray on the perimeter of the third section. Any number of separate sections, such as neighboring sections, may continue to be sampled based on the indication of the object. Alternatively, interpolation may be utilized instead of casting more rays, or a combination of additional rays and interpolation may be used.

In act 423, after or during the sampling of the rays, each of the grid points of the grid is associated with an image value for displaying an image rendered from the sampling of the rays, such as at least the first rays. Any image construction technique may be utilized. For example, matrix transformation, gradient estimation and/or correction, lighting calculations, polynomial calculations, surface rendering, image mesh techniques, and/or any other mathematical or digital signal processing method for generating 2D, 3D, or 4D images is used. The images are displayed on the display 108, which is operable to display an image as a function of the sampling rays. The images are displayed during a definitive (final) mode and/or interactive mode. For example, sampling of the first, second, third, and/or fourth rays occur during an interactive mode in which user input received indicates a change in the viewing direction relative to the volume.

The imaging system 100 includes instructions that can be executable by the processor 112 of FIG. 1. The instructions are stored in a computer-readable medium, such as the memory 104. The instructions implement the methods, acts, and processes described above. The instructions for implementing the processes, methods and/or techniques discussed above are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system. Also, any of the features, methods, techniques described may be mixed and matched to create different systems and methodologies.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method of volume rendering, the method comprising:
    sampling, with a processor, a plurality of first rays in a first spatial density through a volume, each first ray being in a separate section;
    comparing, with a processor, a value of at least one first ray to a first threshold;
    sampling, with a processor, a plurality of second rays in a second spatial density based on the comparison of the at least one first ray, the second rays being in a first spatial section of the separate sections, the first section being for the at least one first ray and including a first perimeter formed by coordinates on edges of the first section;
    comparing, with a processor, a value of at least one second ray to a second threshold;
    sampling, with a processor, a plurality of third rays in a second section spatially different than the first section and at the second spatial density based on the comparison of the at least one first ray and the comparison of the at least one second ray, the second section spatially different than the first section by having a second perimeter formed by coordinate on edges of the second section, where coordinates in an interior of the second perimeter are outside the first perimeter; and
    displaying an image rendered from the sampling of at least the first rays.

2. The method of claim 1, wherein the sampling of the first, second, and third rays occur during an interactive mode.

3. The method of claim 2, wherein the interactive mode comprises receiving user input indicated a change in viewing direction relative to the volume.

4. The method of claim 1, wherein the second section is a neighboring section to the first section.

5. The method of claim 1, further comprising:
comparing a value of at least one third ray to a third threshold, sampling a plurality of fourth rays in a third section spatially different than the second section based on the comparison of the at least one third ray.

6. The method of claim 5, wherein the third section is a neighboring section to the second section.

7. The method of claim 1, wherein the at least one first ray passes through a corner point or center point of the first one of the separate sections.

8. The method of claim 7, wherein the first one of the separate sections comprises an 8×8 grid.

9. The method of claim 1, wherein the at least one second ray passes through a point of the first section different than the locations of the first rays.

10. The method of claim 9, wherein the first section comprises a 4×4 grid.

11. The method of claim 9, wherein the first section comprises a 2×2 grid.

12. The method of claim 1, wherein the second threshold is lower than the first threshold.

13. The method of claim 1, wherein comparing the value of the at least one first ray to the first threshold comprises determining if a value difference between at least two first rays is above the first threshold, and wherein comparing the value of the at least one second ray to the second threshold comprises determining if a value difference between the at least one second ray and another ray is above the second threshold.

* * * * *